United States Patent [19]
Durney

[11] Patent Number: 5,979,525
[45] Date of Patent: Nov. 9, 1999

[54] METHOD AND APPARATUS FOR SCORING A WORKPIECE IN ADVANCE OF SAWING

[76] Inventor: Max W. Durney, 198 Ely Road, Petaluma, Calif. 94954

[21] Appl. No.: 09/135,843

[22] Filed: Aug. 18, 1998

[51] Int. Cl.[6] .................................................. B27M 1/08
[52] U.S. Cl. ...................... 144/368; 144/3.1; 144/136.95; 144/137; 144/367; 83/862; 83/863
[58] Field of Search ................. 144/1.1, 3.1, 41, 144/134.1, 136.95, 137, 154.5, 363, 367, 368, 371; 83/862, 863, 875, 879, 880

[56] References Cited

U.S. PATENT DOCUMENTS

| | | |
|---|---|---|
| 4,155,383 | 5/1979 | Welliver ................................ 144/154.5 |
| 4,181,164 | 1/1980 | Meniconi . |
| 4,245,390 | 1/1981 | Bond . |
| 4,308,777 | 1/1982 | Lawson . |
| 4,534,256 | 8/1985 | Benuzzi . |
| 4,555,849 | 12/1985 | Ando et al. . |
| 4,706,535 | 11/1987 | Ducharme . |
| 4,711,147 | 12/1987 | Dettelbach et al. . |
| 4,760,870 | 8/1988 | Speck ....................................... 144/3.1 |
| 5,010,651 | 4/1991 | Techter et al. ...................... 144/136.95 |
| 5,117,722 | 6/1992 | Letendre . |
| 5,136,910 | 8/1992 | Kuhn et al. . |
| 5,148,732 | 9/1992 | Striebig . |
| 5,159,870 | 11/1992 | Fiala . |
| 5,287,786 | 2/1994 | Fiala . |

*Primary Examiner*—W. Donald Bray
*Attorney, Agent, or Firm*—Flehr Hohbach Test Albritton & Herbert

[57] ABSTRACT

A saw and router assembly (70) preferably including a hand-held rotary saw (50) and a router device (76) having a router bit (52) mounted immediately forward of rotary saw (50) and in alignment with the plane of the saw blade. In one embodiment, separate motors (72, 76) are provided to drive the rotating saw blade (50) and the router bit (52), and in another embodiment a single motor (102) is operatively coupled to drive both the saw blade (50) and the router bit (52). A method of substantially splinter-free cutting of workpieces (14) also is disclosed.

17 Claims, 10 Drawing Sheets

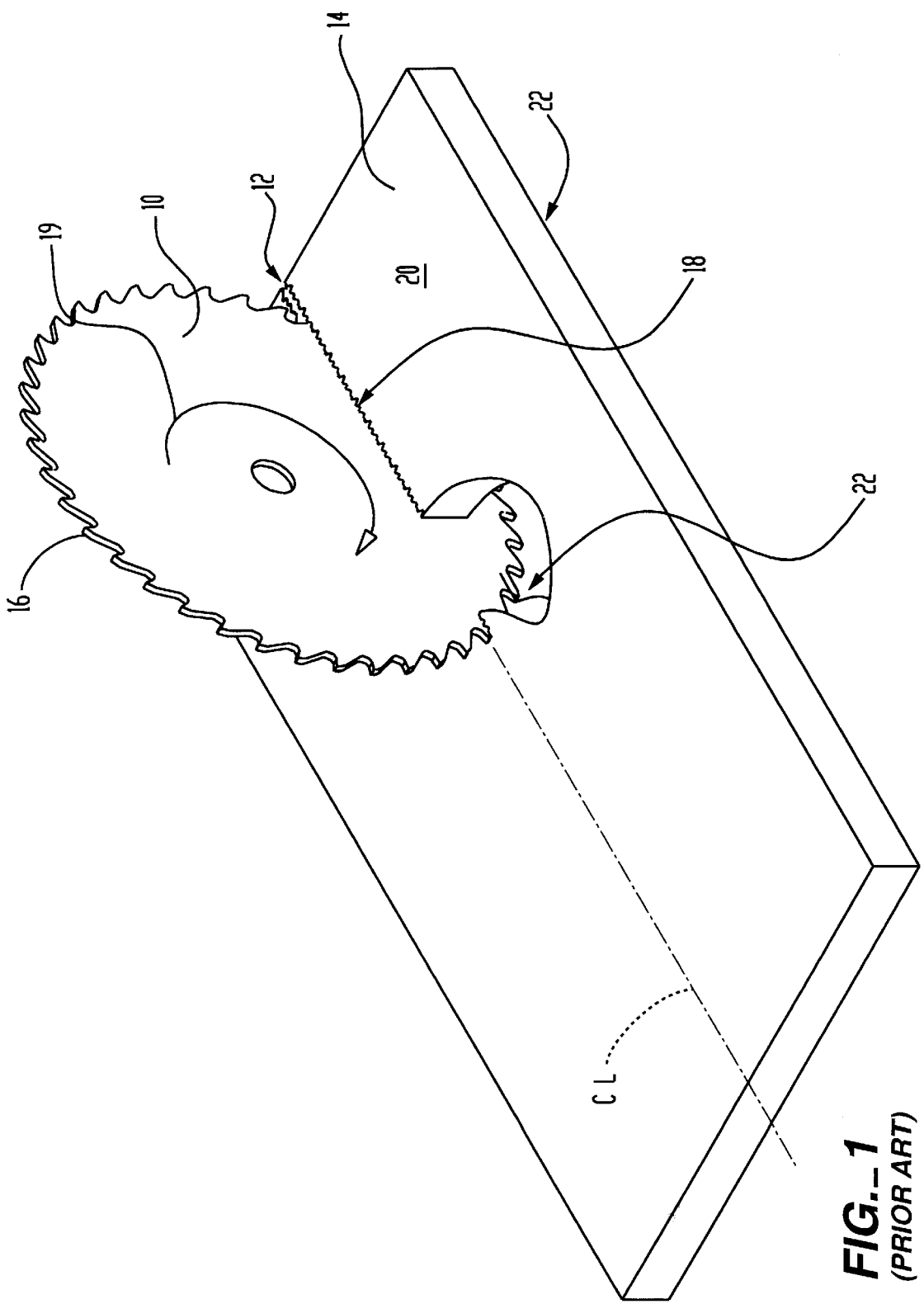
FIG._1 (PRIOR ART)

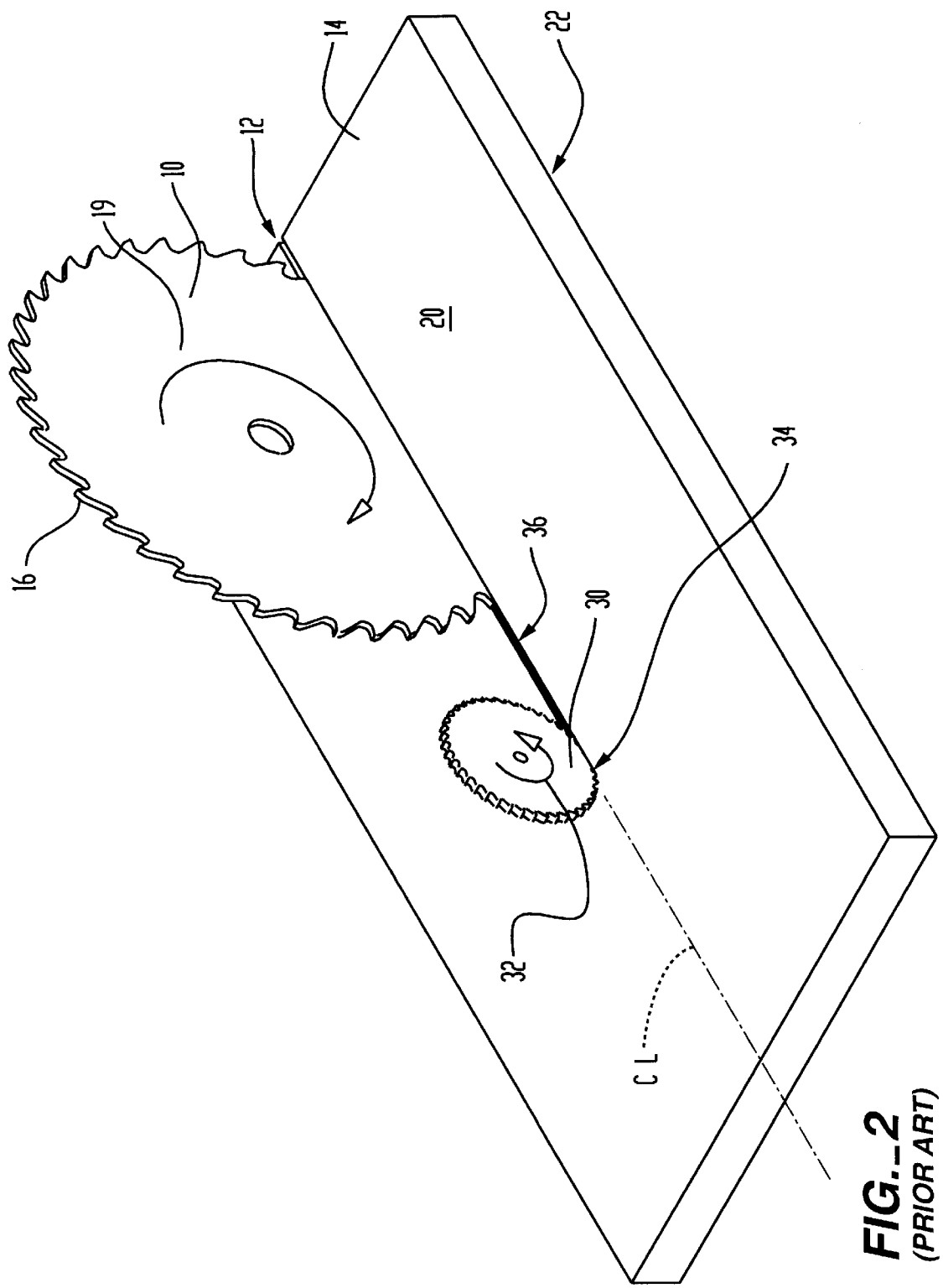
FIG._2 (PRIOR ART)

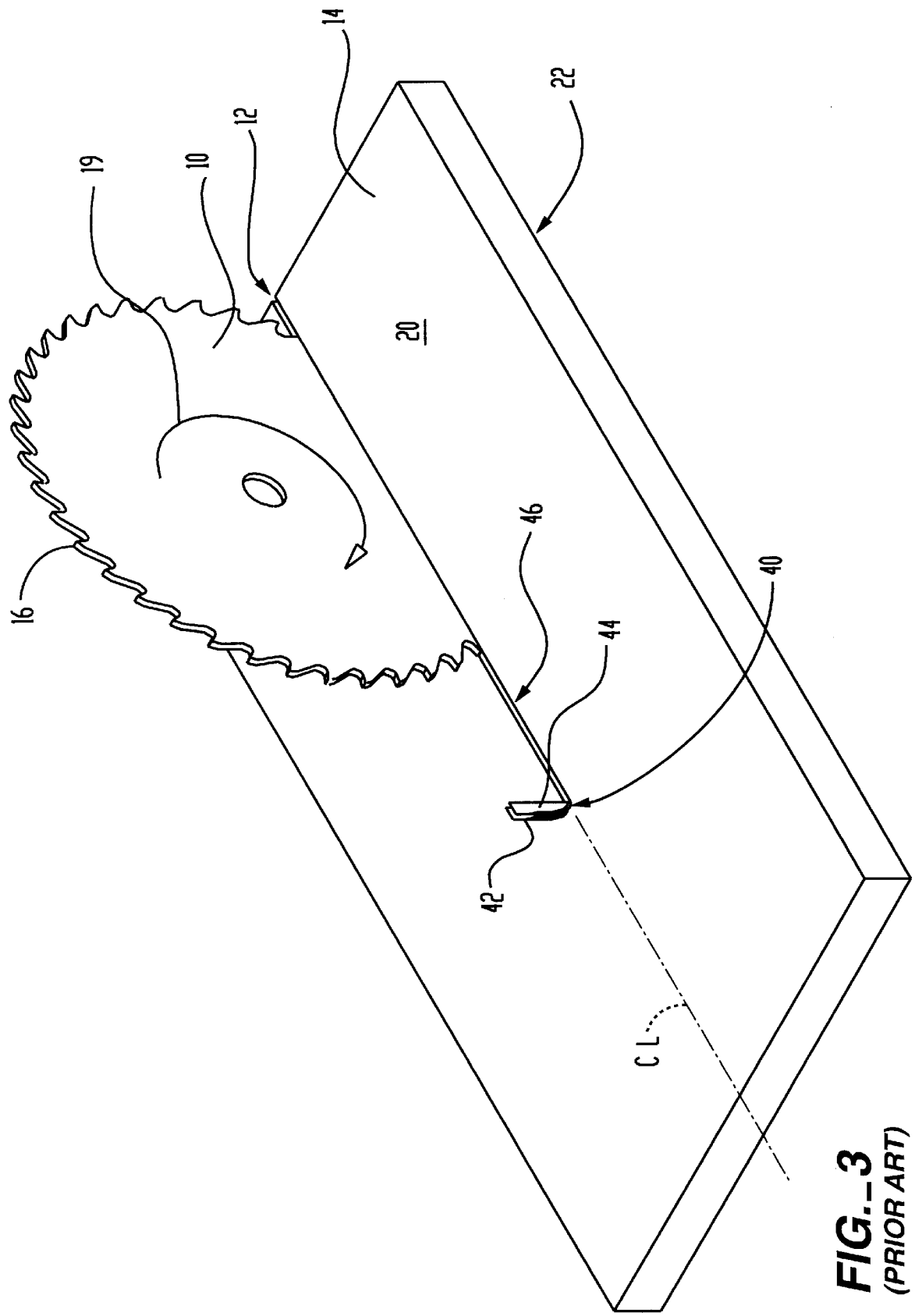
FIG._3
(PRIOR ART)

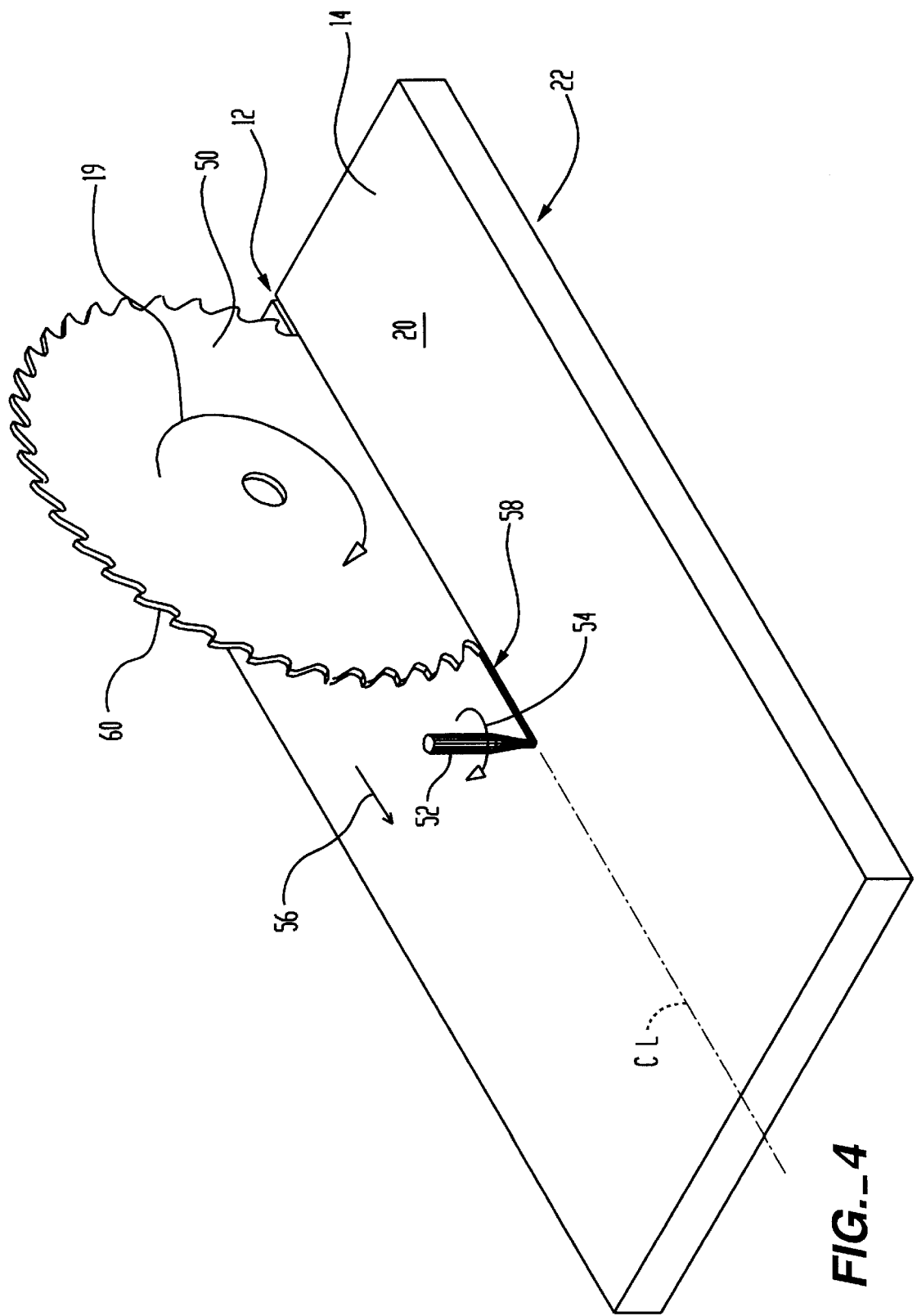
FIG._4

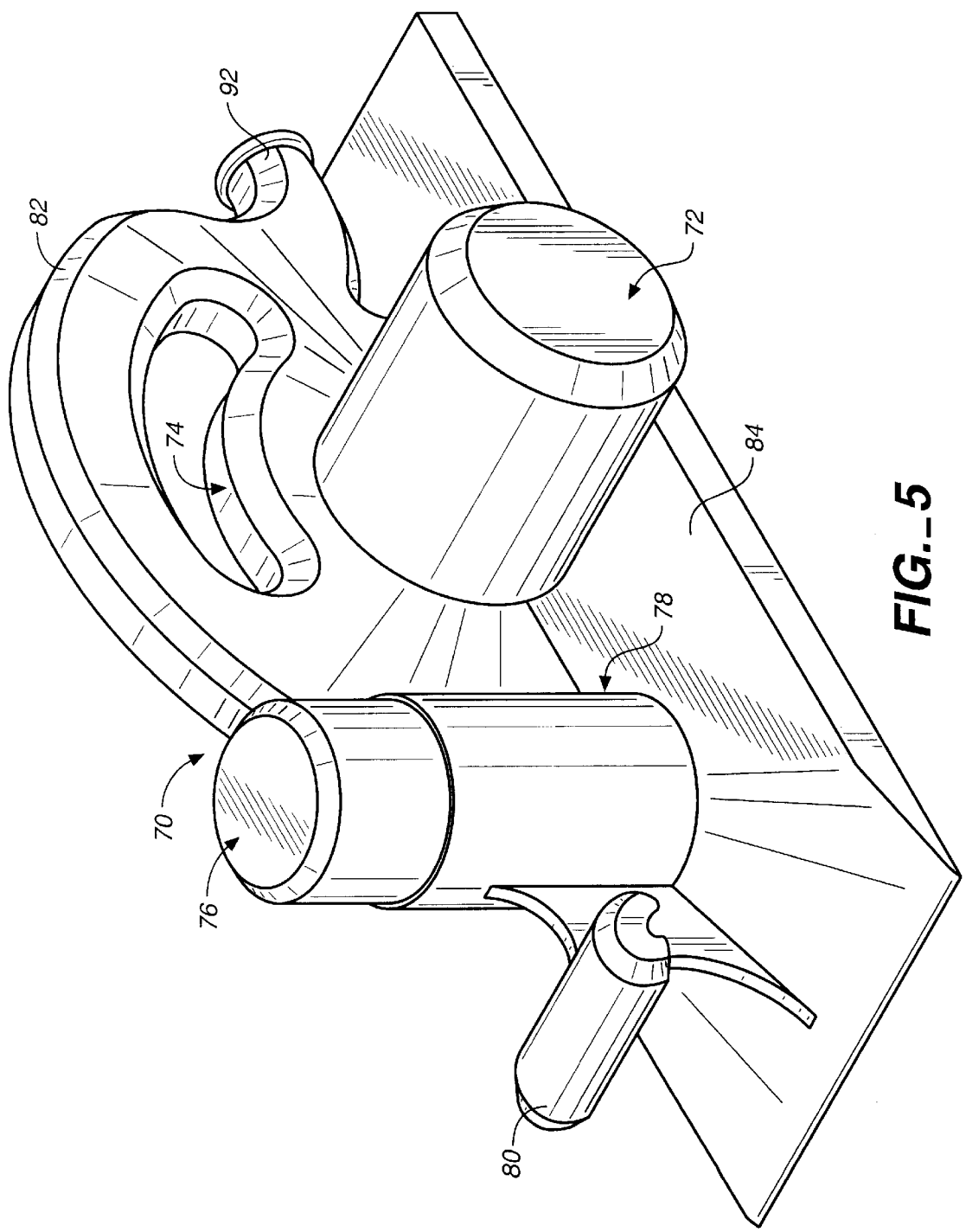
FIG._5

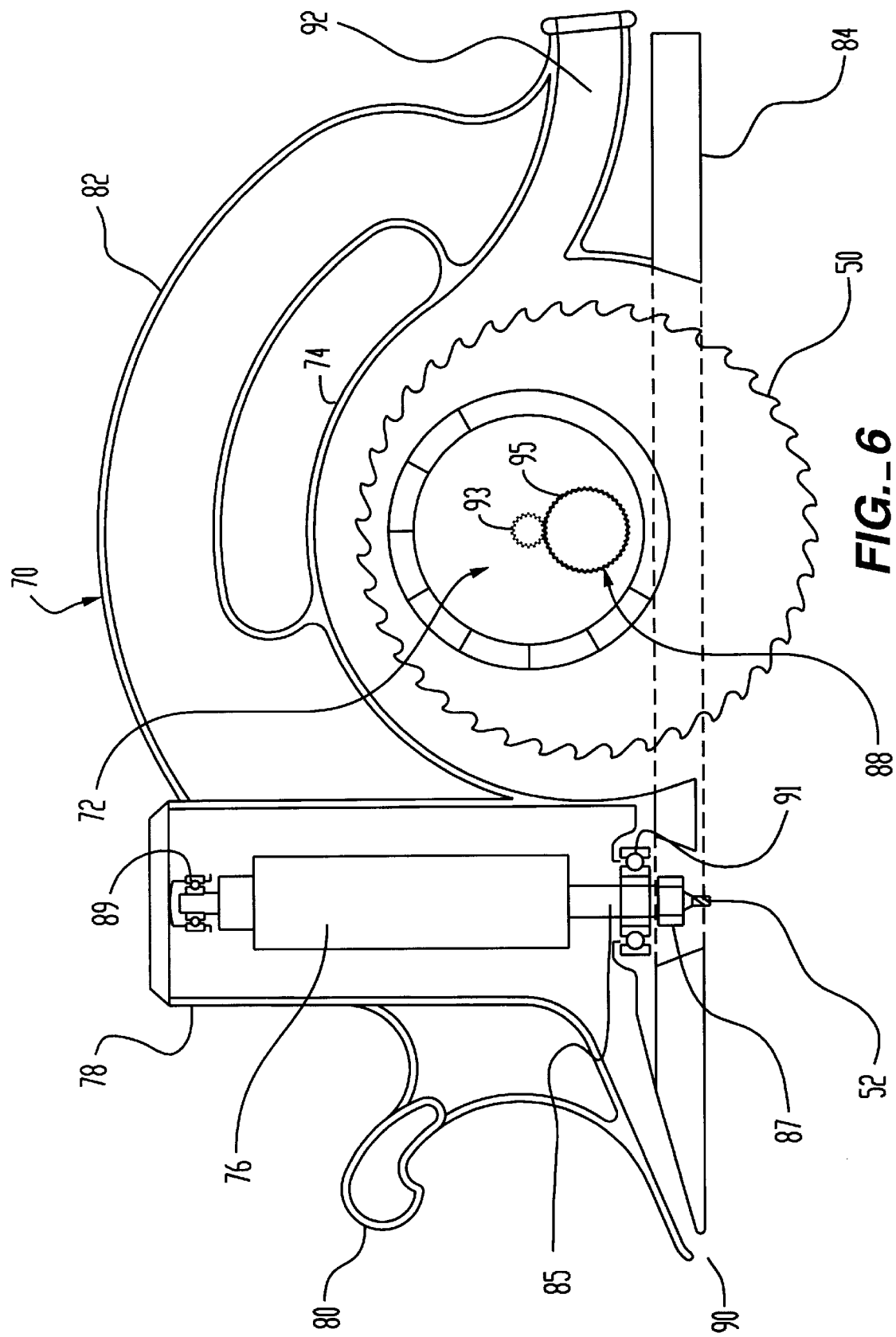
FIG._6

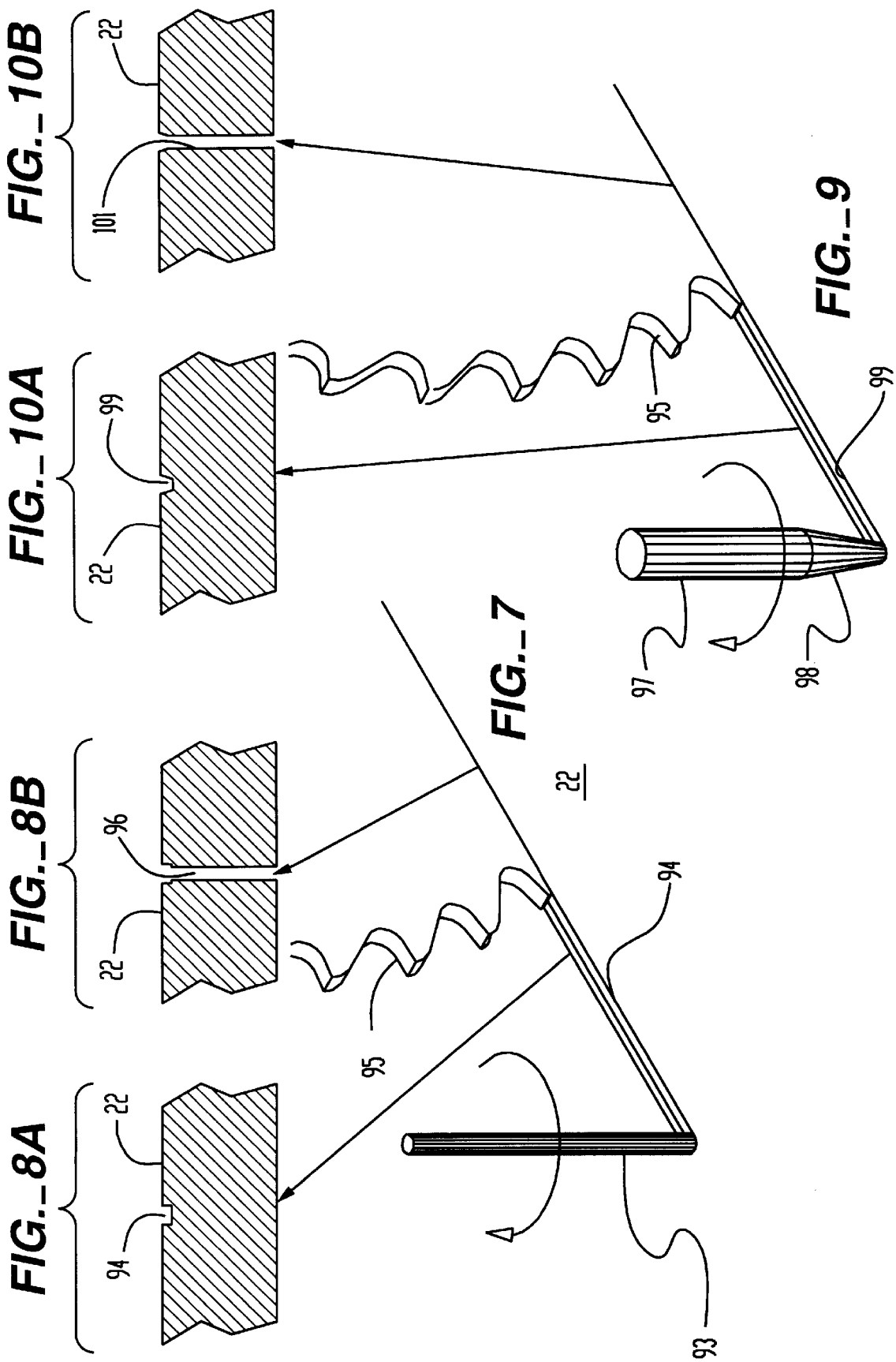

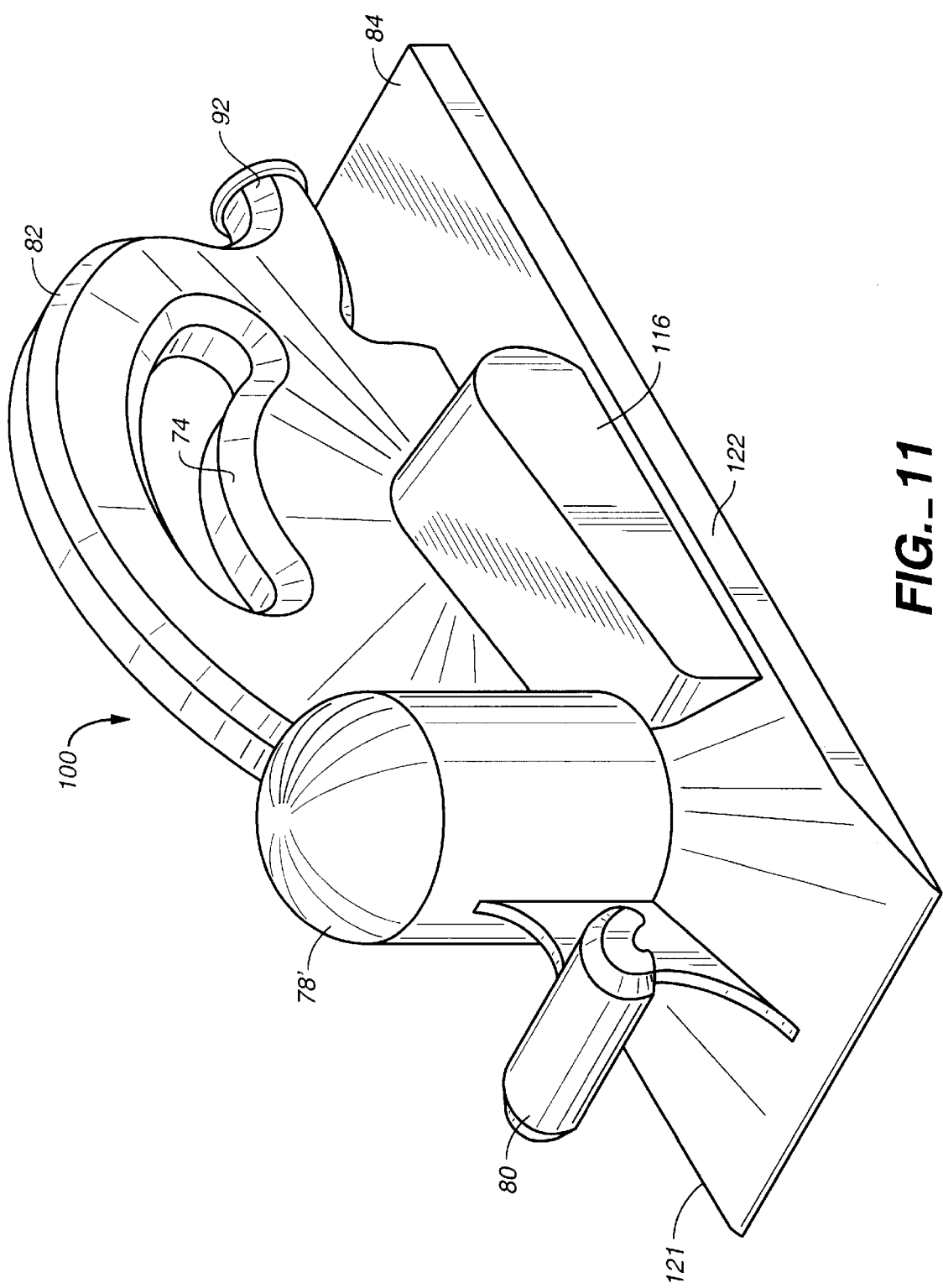
FIG._11

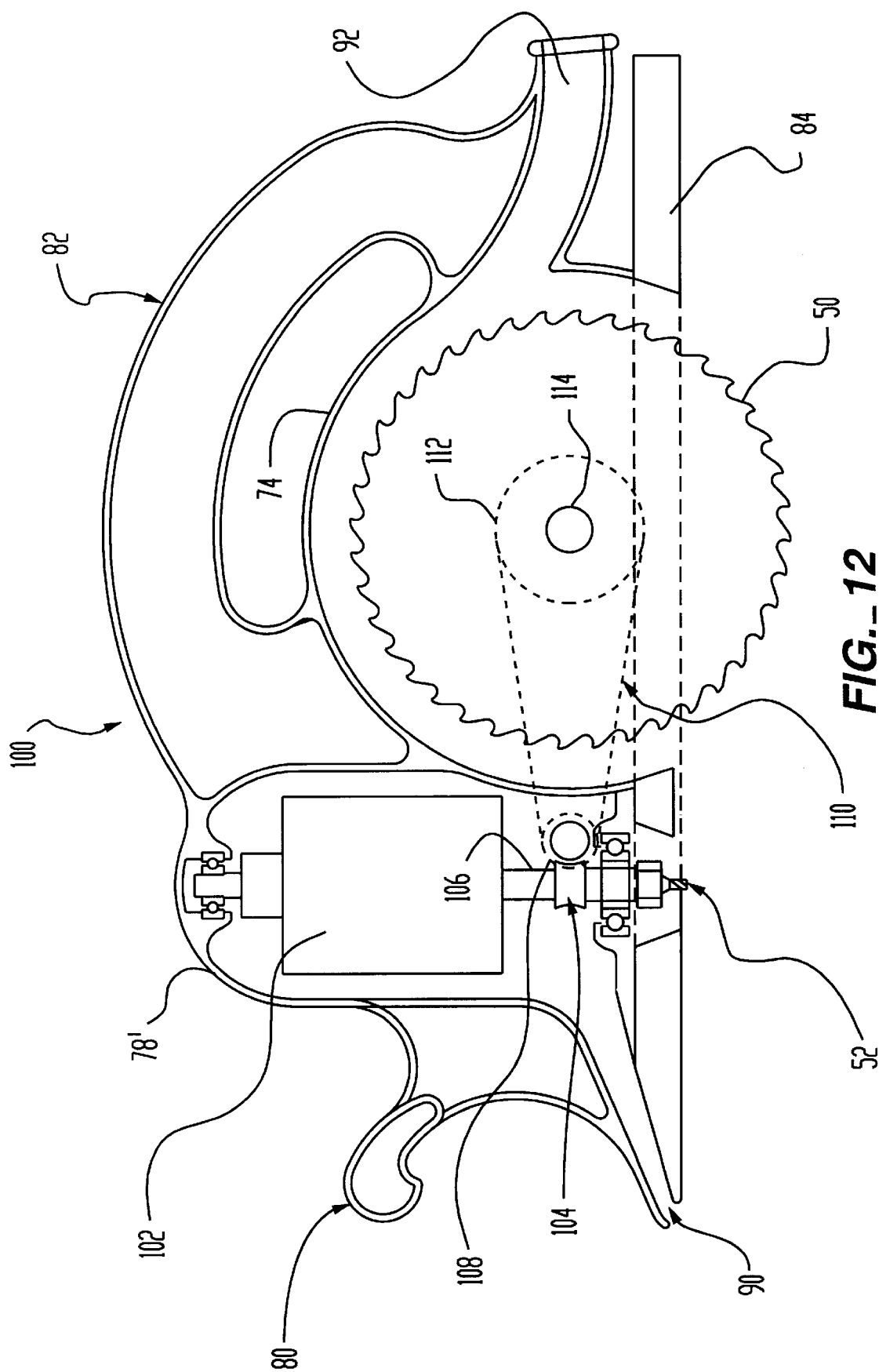
FIG._12

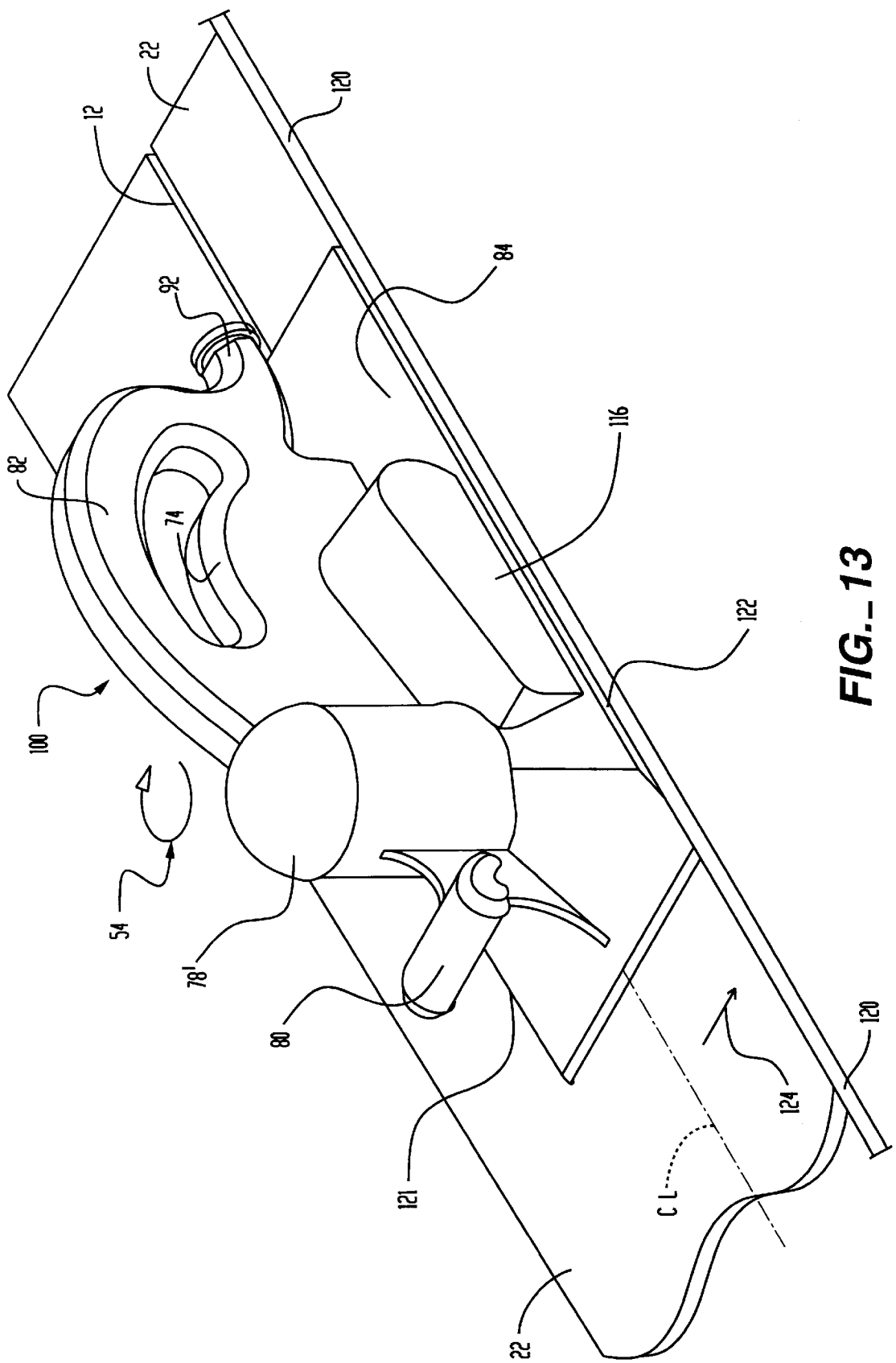
FIG._13

METHOD AND APPARATUS FOR SCORING A WORKPIECE IN ADVANCE OF SAWING

TECHNICAL FIELD

The present invention relates to a scoring and sawing device for cutting workpieces, in particular, laminated and veneer panels, as well as doors, plywood, composite material panels, and the like, which have a tendency to splinter when cut.

BACKGROUND ART

Many different devices and techniques have been developed to score and saw particle board, hardboard, laminated and veneer panels in a manner that avoids splintering at the cut of a circular saw blade. One known technique is to use a single saw first to saw along a cut-line at a shallow depth and with the cutting edge of the saw blade rotating into the workpiece, to score the surface of the workpiece without splintering its surface, and second to saw through the entire depth of the workpiece by moving the cutting blade back along the cut-line with the cutting blade rotating in an opposite direction out of the workpiece but within the previously made score line. U.S. Pat. No. 4,555,849 discloses such a technique.

A second known technique is to provide a prescoring knife, or blade ahead of the saw blade. The prescoring knife or blade cuts through the hard surface of the particle board, hardboard, veneer or laminated surface along a desired cut-line and usually is comprised of a pair of laterally spaced knives or blades. A rotary saw blade subsequently moves between the scored lines made by the knives or blades. The surface scoring made by the knives or blades prevents splintering when the rotary saw blade subsequently cults between the scoring lines. U.S. Pat. No. 4,711,147 and U.S. Pat. No. 4,245,390 devices for scoring and sawing by this technique.

A third technique uses a combination rotary cutting saw and rotary scoring saw, with the scoring saw positioned ahead of the cutting saw and rotated in a direction opposite to that of the cutting saw. The scoring saw naturally only cuts to a predetermined depth while the cutting saw cuts entirely through the workpiece. U.S. Pat. Nos. 5,117,722, 4,706,535, 4,308,777, 5,148,732, 5,287,786, 5,159,870 and 4,181,164 disclose devices for practicing this type of scoring technique.

While the foregoing devices and techniques for scoring and sawing are satisfactory for preventing splintering, they either require more than one step and, thus, are more time consuming than necessary, or involve devices that are bulky and larger than desirable for manual handling of the device. The present invention improves upon the foregoing art by providing a compact, easy to use scoring and sawing device that is adapted to cut a variety of materials.

DISCLOSURE OF INVENTION

Briefly described, the present invention comprises a hand saw and router device for making a smooth-edge cut in a workpiece and includes a saw for sawing the workpiece along a cut line and a router secured to the saw for movement therewith. The router includes a router bit that is aligned with the kerf of the saw blade and is positioned to cut a groove in the saw tooth exit side of the workpiece along the cut line ahead of the saw blade. The saw includes a saw blade that is adapted to saw in a manner where the peripheral edge of the blade exits from the exit side of the workpiece within the groove carved by the router. In operation, the device moves over the workpiece and the router carves a groove along the cut line ahead of the saw blade, and the saw blade saws the workpiece with its peripheral edge moving through the pre-cut groove in a manner that avoids lateral splintering or chipping of the cut edge of the workpiece.

According to an aspect of the invention, the saw blade is a rotary saw blade and is rotated in a manner where its peripheral cutting edge exits the workpiece on the exit side surface ofthe workpiece so that the opposite side of the workpiece does not splinter.

According to an aspect of the invention, the router bit includes a down-helix carving edge that produces a downward shear when scoring. A downward shear ensures that the router itself does not splinter the exit side surface of the workpiece ahead of the saw.

According to another aspect of the invention, the router bit is positioned immediately in front of the saw blade, which allows for a more compact arrangement for the hand saw and router device because the router can be made much smaller than rotary saw blades used for scoring. As a result, handling and operation of the device is improved.

According to another aspect of the invention, one of the rotary saw blade and router includes a side edge that is parallel to the saw blade and is adapted to slide along a longitudinal guide member spaced from the cut line. Rotation of the router creates a bias force that biases the device against the guide member. The side edge of the device is positioned on the side of the rotary saw that is biased by the router laterally away from the cut line. This has the effect of improving tracking of the device along the cut line.

The present invention also comprises a method of sawing a workpiece and includes the steps of sawing the workpiece along a cut line with a saw, preferably a rotary saw, in a manner where the peripheral cutting edge of the saw exits from an exit side of the material, and in front of the saw blade, carving a groove in the exit side of the workpiece by means of a router that includes a router bit aligned with the saw.

According to an aspect of the method of the present invention, the saw is biased by the router against a guide member spaced from the cut line, as the workpiece is sawed, which as stated previously, improves straight tracking of the device.

These and other features, objects, and advantages of both the method and apparatus of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein:

FIG. 1 is a pictorial, schematic view of a standard rotary saw cutting through a workpiece;

FIG. 2 is a pictorial, schematic view of a prior art dual-saw technique for cutting a workpiece without splintering;

FIG. 3 is a pictorial, schematic view of a prior art saw and scoring knife technique for cutting a workpiece without splintering;

FIG. 4 is a pictorial, schematic view of a combination hand saw and router embodiment of the present invention;

FIG. 5 is a pictorial view of a two-motor version of the hand saw and router of FIG. 4;

FIG. 6 is a cut-away view of the combination hand saw and router of FIG. 5;

FIG. 7 is a schematic pictorial view of a straight-sided router bit carving a groove in a workpiece ahead of a saw blade;

FIG. 8A is a sectional view of the workpiece after being scored by the router of FIG. 7;

FIG. 8B is a sectional view of the workpiece after being both scored and cut by the saw blade;

FIG. 9 is a schematic pictorial view of a conical router bit carving a beveled groove in a workpiece ahead of a saw blade;

FIG. 10A is a sectional view of the workpiece after being cored by the router of FIG. 9;

FIG. 10B is a sectional view of the workpiece after being both scored and cut by the saw blade;

FIG. 11 is a pictorial view of a single-motor hand saw and router embodiment of the present invention;

FIG. 12 is a cut-away view of the combination hand saw and router of FIG. 11; and FIG. 13 is a pictorial, view of the hand saw and router of FIG. 11 shown being used in a guided manner to produce a straight cut.

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Referring to FIG. 1, when a conventional rotary saw blade 10 makes a cut 12 in a workpiece 14 along a cut line CL thereof, it is common for the cutting edge 16 of the emerging blade to cause lateral splintering or chipping 18 at the surface edge of cut 12 when the blade is rotated in the direction of arrow 19 out of the surface 20 of workpiece 14. Surface 14 is referred to herein as the exit side surface of workpiece 14 because the cutting edge 16 emerges or exits from workpiece 14 at surface 20. The opposite surface 22 is referred to as the entrance side surface. For many types of materials, splintering occurs on exit side surface 20 because this surface has little support to resist the pulling action of the cutting teeth as the cutting teeth emerge from the workpiece. The problem of splintering and the types of material prone to splintering are generally well understood in the art.

Referring to FIG. 2, a known solution to the problem of splintering includes the provision of a leading rotary scoring blade 30 ahead of and in line with rotary cutting blade 10. Scoring blade 30 is rotated in an opposite direction, indicated by arrow 32, to the rotation direction of cutting blade 10. The cutting edge 34 of scoring blade 30 enters downward into surface 20 of workpiece 14 and, as a result, avoids splintering at a groove 36. Rotary scoring blade 30 is also mounted in a way that its cutting edge 34 cuts workpiece 14 to a predetermined depth, to create a shallow groove. Rotary cutting blade 10 travels through groove 36 to create a smooth cut 12 without causing splintering at either the entrance side 20 or exit side 22 of the workpiece.

Referring to FIG. 3, a second known solution to the problem of splintering is the provision of a pre-scoring knife 40 that includes a pair of spaced blades 42, 44 that are mounted ahead of and in line with rotary cutting blade 10. Blades 42, 44 cut a pair of score lines 46 in surface 20 at a predetermined depth that prevents splintering when cutting blade 10 cuts between score lines 46.

The scoring techniques illustrated in FIGS. 2 and 3 perform well at preventing splintering, but the devices for these techniques can be large and bulky and can have difficulty scoring certain types of materials.

Referring to FIG. 4, the scoring router and saw concept of the present invention includes a cutting blade that preferably is a conventional rotary saw blade 50, but may also comprise another type of saw blade such as, for example, a reciprocating saw or band saw, or the like. Rotary saw blade 50 is rotated in the direction of arrow 19 so that its peripheral cutting edge 60 emerges from the upper, exit side surface 20 of workpiece 14.

The present invention also includes a router bit 52, aligned with the plane of the cutting blade 50 and rotated either clockwise or counterclockwise, but is shown as being rotated clockwise in the direction of arrow 54. Both cutting blade 50 and router bit 52 are mounted for movement together in the direction of arrow 56 along cut line CL. Router bit 52 pre-scores a groove 58 at a predetermined depth, through which the cutting edge 60 of cutting blade 50 moves to make a smooth-edge cut 12 in workpiece 14.

Rotary cutting blade 50 and router bit 52 can be made of any conventional metal, metal alloy or composite material generally used for saw blades and routers, although a solid carbide material has been found to be particularly desirable for the router bit.

The provision of a router for scoring has several advantages over prior art solutions to splintering. An important advantage is that a router is a relatively small component and can be packaged closely proximate or immediately in front of a rotary cutting blade in a compact configuration that provides a device which is easy to handle and maneuver. A router is also a reliable cutting tool that can easily cut through almost all conventional types of materials used for panel-like workpieces. In addition, a router does not deliver a lifting force that potentially could splinter the surface of the workpiece and is highly accurate in producing a precise groove width to match the kerf of the saw blade.

Referring to FIG. 5, a first, practical embodiment of the present invention is shown as a two-motor hand saw and router 70. In this embodiment, a first motor 72 is provided for the rotary cutting blade, which is enclosed in housing 74, and a second motor 76 is provided for the router bit, which is rotatably mounted in housing 78. The cutting blade motor 72 is larger than the router motor 76 and includes, if necessary, a gear assembly, discussed later, for reduced speed blade rotation and motor offset. Router motor 76 is preferably directly coupled to the router bit, also discussed later.

Hand saw and router 70 also includes a forward handle 80 and a rear handle 82, for manual gripping and controlling movement of the device. Components 72, 74, 76, 78, 80, 82 are mounted together on a base bed 84 having a flat underside for guided movement over a surface of a workpiece. While a hand-held router and saw blade is illustrated as a preferred form of the present invention, other circular saw versions are possible, such as a table saw or panel saw.

With a table saw, the router would be inverted to project out of the table and the rotary saw blade would rotate into the table and both the router and saw blade would be fixed in position. With a panel saw, the router and saw blade would be mounted on linear bearings of a carriage and moved together across a stationary workpiece.

Referring to FIG. 6, shown in more detail is the direct-drive connection between router motor 76 and router bit 52 via drive shaft 85 and collet 87 mounted for rotation by a pair of bearings 89, 91. With the provision of router bit 52 immediately in front of rotary saw blade 50, the overall length of the device can be shortened as compared to prior art dual-saw devices because the smaller dimensions of the router allow the router to be positioned closer to the cutting blade and, thus, allows for a more compact arrangement. A router also easier to align with a rotary saw blade because angular alignment problems associated with rotary scoring blades is eliminated.

Gears 88, 93 are provided between cutting blade motor 72 and cutting blade 50. Gear 93 is directly coupled to motor 72 and gear 88 is directly coupled to rotary saw blade 72 via shaft 95. As is illustrated in FIG. 6, router 52 does not extend down beneath base bed 84 as far as saw blade 50 because router 52 cuts the workpiece to a shallow predetermined depth, which depends on the material of the workpiece. If desired, router bit 52 can be adjustably mounted so that its depth of scoring can be selectively adjusted. Gear 93 provides an offset for saw blade 50, which allows the blade to be positioned lower beneath base bed 84 than would be otherwise achieved with a direct drive connection.

Hand saw and router 70 also includes a front air blower 90, which directs air from housing 78 out the front of the device, to sweep the path of the device in advance of cutting. Sweeping the area avoids marring of the workpiece surface and also ensures a more accurate cut. Also included is an air outlet 92, which allows for exhaust of sawdust or other cut particles of the workpiece from housing 74. The housing 74 is separately ducted from air inlet 90 to prevent cut particles from entering router motor 76.

Preferably, router bit 52 includes a down-carving edge that produces a downward shear when routing a groove. A downward shear ensures that the surface of the workpiece is not splintered by the router, but it does require extra downward force to be applied by the user in order to maintain base bed 84 down on the workpiece.

FIGS. 7–10 illustrate two ways to ensure that the width of the groove made by the router approximates the width of kerf made by the saw. In FIG. 7, router bit 93 is a straight sided cylindrical router bit with a fixed, uniform diameter along its length. Router bit 93 makes a rectangular score line or groove 94 in the workpiece 22, which is shown in section in FIG. 8A. Rotary saw blade 95 is specifically selected to be narrower than groove 94 so that the width of its kerf 96 (FIG. 8B) is narrower than groove 94. Saw blades, however, are typically significantly narrower than router bits. Accordingly, to avoid creating a kerf that is much narrower than the groove, saw blade 95 can either be warped or have its teeth specifically formed to create a wide kerf, or two or more blades can be shimmed together and properly fitted and oriented to create a wider kerf. Ideally, the difference in widths between the groove and the kerf is within the range of $2/1000$–$10/1000$'s of an inch, which creates an imperceptible difference between the widths of the groove and kerf.

Referring to FIG. 9, an alternative way of achieving substantially similar groove and kerf widths is to use a router bit 97 with a conical calling end 98. Router bit 97 produces a sloped groove 99 in workpiece 22 (FIG. 10A). Router bit 97 is adjustably mounted for selective vertical alignment in the collet of the router so that the depth of resulting groove 99 in workpiece 22 can be varied. Conical router end 98 not only produces variable depth grooves, but the width of the groove varies as the depth is varied. As a result, the width of the groove can be varied to approximate the width of a given rotary saw blade 95 to achieve the aforementioned width difference between the groove and the kerf of the saw blade. The resulting kerf 101 (FIG. 10B) in workpiece 22 has a slightly beveled cut edge, which, depending on the angle of conical end 98, may be a desired feature.

FIGS. 11 and 12 illustrate a single motor version of a hand saw and router 100 of the present invention, which has several advantages over the two-motor version of FIGS. 5 and 6. Hand saw and router 100 includes many of the same components as the two-motor version shown in FIGS. 5 and 6, including cutting blade 50 and router 52 and housings 74 and 78' therefor, handles 80, 82, and air inlet 90 and particle outlet 92. In addition, a similar base bed 84 is provided for mounting the foregoing components.

Router housing 78' is slightly modified to accommodate a larger, single router and blade motor 102, which provides power for both router bit 52 and cutting blade 50. A helical gear 104 is mounted on the drive shaft 106 of motor 102 and is drivingly engaged with a transverse helical gear shaft 108 rotatably mounted adjacent drive shaft 106. A drive belt 110 is entrained around a sheave on shaft 108 and around a sheave 112 mounted onto a cutting blade shaft 114. Gears 104, 108 provide for a reduced RPM for cutting blade 50, which may be necessary depending on motor type, motor size and type of material to be cut. As shown in FIG. 7, a shroud 116 is provided for enclosing drive belt 110.

The single-motor version is advantageous because it is more symmetrical than the two-motor version and has fewer components. With the two-motor version, the motor projects out to one side of the device and for this reason, is difficult to use with a longitudinal guide member on the side of the motor. The outwardly projecting motor also requires different lateral dimensions for the base bed on either side of the saw blade, which complicates to some extent the alignment of the guide mechanism. This concept is discussed in more detail with reference to FIG. 13. The single-motor version, as shown in FIG. 11, has side edges 121, 122 that both can be guided to produce a straight cut.

Referring to FIG. 13, hand saw and router 100 is shown saving a workpiece 22 along cut-line CL. Adjacent workpiece 22 is provided a guide rail 120. To produce a smooth-edge cut, it is certainly desirable to use the device with a longitudinal guide member, positioned on either side of the device. In use, the side edge 122 of base bed 84 slides along guide rail 120 in order to create a straight cut 12. Of course, side edge 122, as well as side edge 121 are parallel with the plane of the saw blade. Use of the device without a guide rail most likely will result in the blade not tracking within the groove made by the router, with the result being splintering at the cut edge.

An advantage that can be achieved with the present invention is a biasing effect produced by the router. The direction of rotation of the router is indicated by arrow 54. As a result of the router's direction of rotation, the front end of the device is biased in the direction of arrow 124 toward guide rail 120, which has the effect of keeping the hand saw and router device butted against the guide rail and tracking along cut-line CL. If the guide rail is positioned on the opposite side of the device, adjacent side edge 121, this biasing effect may be seen as a disadvantage by requiring additional lateral manual force to keep the device butted against the guide rail. Regardless, the biasing force is not substantial and can if desired be used to its advantage to improve tracking.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

The invention claimed is:

1. A device for making a smooth-edge cut in a workpiece, comprising:

a saw for sawing the workpiece along a cut line, the saw including a saw blade movable to exit from an exit side of the workpiece, and a router secured to the saw for movement therewith, the router including a router bit aligned with the plane of the saw blade, the router bit being positioned to cut a groove in the exit side of the workpiece along the cut line ahead of the saw blade.

2. The device of claim 1 wherein, the saw is a rotary saw.

3. The device of claim 2 wherein, the rotary saw is a hand-held rotary saw having the router secured thereto.

4. The device of claim 1 wherein, the router bit includes a down-helix cutting edge that produces a downward shear when cutting.

5. The device of claim 1 wherein, the router bit is positioned immediately in front of the saw blade.

6. The device of claim 1 wherein, the router bit is made from a solid carbide material.

7. The device of claim 2 wherein, one of the saw and router includes a side edge adapted to move along a guide member spaced from the cut line, the side edge positioned on the side of the cut line toward which the router laterally urges the device when the device saws the workpiece.

8. The device of claim 3 wherein, a single motor is provided for rotating the router bit and the saw.

9. The device of claim 3 wherein, separate motors are provided for rotating the router bit and the saw.

10. The device of claim 2 wherein, the saw blade is a rotary saw blade rotated in a direction causing the saw blade to exit the top side of the workpiece.

11. The device of claim 1 wherein, the router includes a conical end and is vertically adjustable to produce a groove of variable width.

12. A method of a sawing workpiece comprising:

sawing the workpiece along a cut line with a saw in a manner where the cutting edge of the saw blade exits from an exit side of the workpiece, in front of the saw blade, cutting a groove in the exit side of the workpiece along the cut line in advance of the saw blade using a router that includes a router bit aligned with the saw blade, and the sawing step is accomplished by using a hand-held rotary saw and router, and the rotation of the router laterally biases the hand-held rotary saw and router against a guide member spaced from the cut line as the workpiece is sawed.

13. The method of claim 12 wherein, the cutting step is accomplished using a router bit having a down-helix cutting edge.

14. The method of claim 12 wherein, the cutting step is accomplished using a router bit positioned immediately in front of the saw blade.

15. The method of claim 12 wherein, the sawing step is accomplished using a rotary saw.

16. The method of claim 12 wherein, the sawing step is accomplished using a hand-held rotary saw and router, and the rotation of the router laterally biases the hand-held rotary saw and router against a guide member spaced from the cut line as the workpiece is sawed.

17. The method of claim 12 wherein, the sawing step is accomplished using a rotary saw having a rotary saw blade that rotates in a direction causing its cutting blade to exit from the top side of the workpiece, and the cutting step is accomplished by cutting the groove in the top side of the workpiece at a position closely proximate the saw blade.

* * * * *